United States Patent [19]

Watkins et al.

[11] Patent Number: 4,549,609

[45] Date of Patent: Oct. 29, 1985

[54] TREATING FINES-CONTAINING EARTHEN FORMATIONS

[75] Inventors: David R. Watkins, Irvine; Robert K. Knight; Donald C. Young, both of Fullerton; Leonard J. Kalfayan, Claremont, all of Calif.

[73] Assignee: Union Oil Company of California, Los Angeles, Calif.

[21] Appl. No.: 641,360

[22] Filed: Aug. 15, 1984

Related U.S. Application Data

[63] Continuation of Ser. No. 528,877, Sep. 2, 1983, abandoned.

[51] Int. Cl.$^4$ .............................................. E21B 43/24
[52] U.S. Cl. ..................................... 166/303; 166/272
[58] Field of Search ................................ 166/272, 303

[56] References Cited

U.S. PATENT DOCUMENTS

| | | | |
|---|---|---|---|
| 2,761,835 | 9/1956 | Brown | 252/8.55 D |
| 2,761,836 | 9/1956 | Brown | 252/8.55 D |
| 2,761,837 | 9/1956 | Brown | 252/8.55 D |
| 2,761,838 | 9/1956 | Brown | 252/8.55 D |
| 2,761,839 | 9/1956 | Brown | 252/8.55 D |
| 2,761,840 | 9/1956 | Brown | 252/8.55 D |
| 2,761,841 | 9/1956 | Brown | 252/8.55 D |
| 2,761,842 | 9/1956 | Brown | 252/8.55 D |
| 2,761,843 | 9/1956 | Brown | 252/8.55 D |
| 3,333,637 | 8/1967 | Prats . | |
| 3,384,177 | 5/1968 | Day et al. | 166/307 |
| 3,533,472 | 10/1970 | Cornelius . | |
| 3,938,590 | 2/1976 | Redford et al. . | |
| 4,121,661 | 10/1978 | Redford . | |
| 4,227,575 | 10/1980 | Nooner | 166/303 |
| 4,280,560 | 7/1981 | Sydansk . | |
| 4,475,595 | 10/1984 | Watkins et al. | 166/303 |

OTHER PUBLICATIONS

Day, John J., McGlothlin, B. B. and Huitt, J. L., "Laboratory Study of Rock Softening and Means of Prevention During Steam or Hot Water Injection".

*Primary Examiner*—Stephen J. Novosad
*Assistant Examiner*—Bruce M. Kisliuk
*Attorney, Agent, or Firm*—Dean Sandford; Gregory F. Wirzbicki; Robert A. Franks

[57] ABSTRACT

Method for treating earthen formations which contain water-sensitive, finely divided particulate matter wherein there is injected into the formation steam or a mixture of steam and hot water containing an effective fines-stabilizing amount of a compound containing ammoniacal nitrogen selected from the group consisting of ammonium hydroxide, an ammonium salt of an inorganic acid, an ammonium salt of a carboxylic acid, ammonium cyanate, derivatives of ammonium cyanate, ammonium thiocyanate, and a water-soluble ammonia or ammonium ion precursor selected from the group consisting of amides of carbamic acid and thiocarbamic acid, derivatives of such amides, tertiary carboxylic acid amides and their substituted and akylated derivatives. Preferred additives include ammonium carbonate and urea. If the formation is a subsurface oil-containing formation, the treatment can be part of a method for enhanced oil recovery.

25 Claims, No Drawings

TREATING FINES-CONTAINING EARTHEN FORMATIONS

This application is a continuation of application Ser. No. 528,877, filed Sept. 2, 1983 now abandoned.

BACKGROUND OF THE INVENTION

1. Field of the Invention

This invention relates to a method for treating earthen formations which contain clay, shale or other fines to improve the flow of fluid through the formation. More particularly the invention relates to such a method wherein the decrease in the permeability of the formation upon contact with water is minimized and the permeability can even be increased.

2. Description of the Prior Art

Many earthen formations contain clays, shales, and/or fines, such as silt sized or smaller particles. The formation can be exposed at the surface of the earth, e.g., roadbeds, hillsides and the like, or it can be a subterranean formation, including both those just below or near the surface in which formations, footings or walls of structures rest, and those a substantial distance below the surface from which oil, gas or other fluids can be produced.

When contacted by water, water-sensitive clays and shales, for example montmorillonite, can swell and decrease the permeability of the formation. Other non-clay fines often are free to move and tend to be carried along with a fluid flowing through the formation until they become lodged in pore throats, i.e., the smaller interstices between the grains of the formation. This at least partially plugs the openings and reduces the permeability of the formation. Thus, finely divided particulate matter can obstruct flow through a formation by swelling, migration or both.

When footings or foundations of buildings rest in formations containing such fines, damage or at least great inconvenience often stems from the inability of the earth to carry away water due to decreased permeability of the formation when wet. Likewise, drainage of formations surrounding septic tanks and underlying roadbeds is desirable.

One common instance in which fluids are produced from or injected into formations is in connection with the production of oil. Often it is desired to treat oil-bearing formations to increase the amount of oil recoverable therefrom. One popular method is to inject steam into the formation. The steam can be either dry or wet, i.e., it can contain a liquid water phase. In some instances steam is injected via a well, the well is then shut in temporarily and allowed to soak, and subsequently production is commenced from this same well. In other instances, steam is injected via one well and acts as a drive fluid to push oil through the formation to one or more offset wells through which the oil is produced. In either instance, when the steam reaches the subterranean formation, it at least partially condenses, thus exposing the formation rocks to fresh water. Even though the steam may act to mobilize the oil in the formation, if the formation contains fines and water-sensitive clays, the permeability of the formation can be so reduced as a result of the contact of the fines by the fresh water, the increase in oil production can be lower than expected, and, in some instances, production can even be lower than before the treatment.

In another instance a fines-containing subterranean formation penetrated by a well may require stimulation because of water damage which occurred during drilling or fracturing operations.

Various treatments have been proposed to stabilize clays in a formation. Such treatments include injecting into the formation solutions containing such materials as potassium hydroxide, sodium silicate, hydroxy-aluminum, organic acid chrome complexes, organic polymers and salts of a hydrous oxide-forming metal such as zirconium oxychloride. While each of these treatments has met with some success in particular applications, the need exists for a further improved method for treating a fines-containing formation to minimize the adverse affect of the fines on formation permeability, particularly when such a formation is contacted by a fluid containing water.

Therefore, it is a principal object of this invention to provide a method for reducing the permeability damage in and/or increasing the permeability of formations containing finely divided particulate matter due to passage of a fluid therethrough.

It is another object to provide a method for inhibiting permeability impairment due to migration, transformation and/or swelling of very fine particles within a porous formation.

It is yet another object to stabilize a formation containing water-sensitive clays, shale and other fines.

It is a further object to provide such a method wherein steam is injected into the formation.

It is a still further object to stimulate a formation which has been damaged by water.

Other objects, advantages and features of this invention will become apparent to those skilled in the art from the following description and appended claims.

SUMMARY OF THE INVENTION

Briefly the invention provides a method for treating or conditioning earthen formations, particularly those which contain finely divided particulate matter, such as water-sensitive clays and shale and/or other fines, which materials are free to move through the formation, transform and/or swell if contacted by an aqueous liquid, whereby the migration, transformation, and/or swelling of the fines is reduced so as to maintain a relatively high permeability through the formation and to increase the permeability of formations previously damaged. The method involves injecting into the formation steam to which has been added at some point prior to the time the steam contacts the formation an effective fines-stabilizing amount, typically more than 0.1 to 25 percent by weight based on the weight of the boiler feedwater used to generate the steam, of a compound containing ammoniacal nitrogen selected from the group consisting of ammonium hydroxide, an ammonium salt of an inorganic acid, an ammonium salt of a carboxylic acid, ammonium cyanate, derivatives of ammonium cyanate, ammonium thiocyanate, and a water-soluble ammonia or ammonium ion precursor selected from the group consisting of amides of carbamic acid and thiocarbamic acid, derivatives of such amides, tertiary carboxylic acid amides and their substituted and alkylated derivatives characterized by the formula:

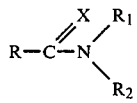

wherein (1) R is hydrogen, or an organic radical, particularly an alkyl group containing 1 to about 8 carbon atoms, or an α-hydroxy substituted alkyl group containing 1 to about 8 carbon atoms, (2) $R_1$ and $R_2$ are independently selected from hydrogen and organic radicals, with alkyl groups containing 1 to about 8 carbon atoms being the preferred organic radicals, and (3) X is oxygen or sulfur. The preferred additives are ammonium carbonate and urea, an amide of carbamic acid. Urea is most preferred. If the earthen formation is a subterranean formation, the treatment can be part of a method for enhanced oil recovery or a method for stimulating production from a formation penetrated by one or more wells.

DETAILED DESCRIPTION OF THE INVENTION

Most formations, regardless of their composition, contain at least some fines, detrital material or authigenic material which are not held in place by the natural cementatious material that binds the larger formation particles, but instead are loose in the formation or become dislodged from the formation when fluid is passed through the formation, as a result of rainfall, flow of ground water or during production of formation fluids via a well penetrating the formation or injection of fluids into the formation from the surface or via a well. The loose fines tend to become dispersed in the fluids passing through the formation and migrate along with the fluid. They are carried along and are either carried all the way through the formation and can be produced if the fluid is flowing to a well, or they can become lodged in the formation in constrictions or pore throats and thus reduce formation permeability. In addition, if the fines are clays or shale which swell in the presence of water and the fluid passing through the formation is or contains water, permeability reduction can occur due to swelled clay or shale particles occupying a greater proportion of the formation pore volume.

Formation fines can be incorporated into the formation as it is deposited over geologic time, or in the case of subterranean formations, can be introduced into the formation during drilling and completion operations. Fines are present to some extent in most sandstones, shales, limestones, dolomites and the like. Problems associated with the presence of fines are often most pronounced in sandstone-containing formations. "Formation fines" are defined as particles small enough to pass through the smallest mesh screen commonly available (400 U.S. Mesh, or 37 micron openings). The composition of the fines can be widely varied as there are many different materials present in subterranean formations. Broadly, fines may be classified as being quartz, other minerals such as feldspars, muscovite, calcite, dolomite and barite; water-swellable clays such as montmorillomite, beidellite, nontronite, saponite, hectorite and sauconite, with montmorillonite being the clay material most commonly encountered; non-water-swellable clays such as kaolinite and illite; shales; and amorphous materials.

In the method of this invention, the above-described fines are stabilized, rendered less likely to reduce permeability when a water-containing fluid passes through the formation, and, in some instances, the permeability of the formation is increased compared to what it was prior to the treatment. In the case of a subterranean formation penetrated by a well, the treatment can improve the production or injection capability of the well, i.e., stimulate the well.

While the reasons for these effects on the formation permeability are not completely understood, and the invention is not to be held to any particular theory of operation, it is believed that the success of this method may be due to one or more of the following: (1) The ammonia or ammonium ions add to the total dissolved solids content both of the water component of the steam, if wet steam is employed, and of the water condensing from the steam itself. These solids appear to decrease the swelling tendency of the clays when exposed to water, even water contacted subsequent to the carrying out of this method. (2) Some non-clay fines treated with steam alone appear to react hydrothermally to produce water-swellable clays which then reduce permeability. The presence of the ammonia or ammonium ions in the steam decreases the occurrence of this reaction to form clays. The ammonia or ammonium ion may react with water-swellable clays to transform them into materials which have less tendency to swell in water.

The method of this invention can be employed to treat or condition fines-containing earthen formations which are exposed at the surface, located just below the surface, or which are located a substantial distance below the surface and are penetrated by a well. In one manner of treating subterranean formations penetrated by a well, the treatment can involve an enhanced oil recovery method wherein steam is injected into the formation to mobilize oil, and the method of this invention prevents formation damage by the steam. In another instance the treatment can involve stimulation of a well penetrating a formation whose permeability has been impaired previously. Such impairment can occur in various ways depending on the previous history of the well, for example, wells drilled with water-base drilling fluid and/or whose surrounding formations have been exposed to water. As used herein the term "stimulation" can include both improving the fluid flow rate through a formation and removing formation damage therefrom.

Examples of suitable ammonium salts of inorganic acids include ammonium chloride, tetramethyl ammonium chloride, ammonium bromide, ammonium iodide, ammonium fluoride, ammonium bifluoride, ammonium fluoroborate, ammonium nitrate, ammonium nitrite, ammonium sulfate, ammonium sulfite, ammonium sulfamate, ammonium carbonate, ammonium bicarbonate, $NH_2COONH_4.NH_4HCO_3$, $(NH_4)_2CO_3.2NH_4HCO_3$, ammonium borate, ammonium chromate and ammonium dichromate. Ammonium carbonate, also referred to as the double salt ammonium sesquicarbonate, is preferred.

Examples of suitable ammonium salts of a carboxylic acid include ammonium acetate, ammonium citrate, ammonium tartrate, ammonium formate, ammonium gallate and ammonium benzoate.

Examples of derivatives of ammonium cyanate include cyanuric acid, urea cyanurate and ammelide.

The ammonium ion precursors suitable for use in this invention are water-soluble materials which hydrolyze in the presence of steam to form ammonia and/or ammonium ions.

One group of ammonium ion precursors are the amides of carbamic acid and thiocarbamic acid including urea, biuret, triuret, thiourea and ammonium carbamate. Urea is the most preferred additive for use in the present invention.

Another group of ammonium ion precursors are derivatives of carbamic acid and thiocarbamic acids including monomethylolurea and dimethylolurea.

Still another group of ammonium ion precursors are tertiary carboxylic acid amides and their substituted and alkylated amide counterparts characterized by the formula:

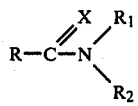

wherein (1) R is hydrogen or an organic radical, particularly an alkyl group containing 1 to about 8 carbon atoms, or an α-hydroxy substituted alkyl group containing 1 to about 8 carbon atoms, (2) $R_1$ and $R_2$ are independently selected from hydrogen and organic radicals, with alkyl groups containing 1 to about 8 carbon atoms being the preferred organic radical, and (3) X is oxygen or sulfur. Preferred tertiary carboxylic acid amides and their substituted and alkylated amide counterparts include formamide, acetamide, N,N-dimethylformamide, N,N-diethylformamide, N,N-dimethylacetamide, N,N-diethylacetamide, N,N-dipropylacetamide, N,N-dimethylpropionamide and N,N-diethylpropionamide. Other species which may be used include N-methyl,N-ethylacetamide, N-methyl,N-octylpropionamide, N-methyl,N-hexyl-n-butyramide, N-methyl,N-propylcaproamide, N,N-diethylcaprylamide and the like. N,N-dimethylformamide is an especially preferred tertiary carboxylic acid amide.

The ammonia or ammonium ion-containing additive should be employed in an amount which is effective in stabilizing fines. This amount will vary depending especially on the nature and amount of fines present in the particular formation being treated and the particular ammonium ion-containing additive used. Typically, there is used more than 0.1 to 25 percent by weight ammonium ion-containing additive, preferably 0.5 to 5 percent by weight, based on the weight of the boiler feedwater used to generate the steam.

Additives which are liquid at ambient temperatures can be added directly either to the boiler feedwater or to the steam itself. If added to the steam, the addition can be made either at the surface as the steam is being injected into the formation or down a well penetrating the formation to be treated, or the additive can be injected downhole via a separate conduit and mixed with the steam downhole prior to its entering the formation. Additives which are solids at ambient temperature can be added directly to the feedwater or a concentrated solution thereof can be prepared and then employed as described above for a liquid additive. An example of a suitable concentrated solution is a solution containing 35 to 50 percent by weight urea and 65 to 50 percent by weight water.

If one of the chief objectives in the application of this treatment to an enhanced oil recovery method is to use steam to mobilize oil which otherwise would be difficult to recover, the amount of steam to be used is well known in the art and is the same as for steam treatments in general. If mobilization of oil is of secondary importance, as in treating a surface formation or a water injection well completed in a fines-containing formation to stabilize the fines, it is recommended that there be used the steam generated from about 250 to 3,000 barrels of feedwater per vertical foot of formation to be treated. Preferably the steam should be injected at a rate of about 200 to 1500 barrels of feedwater per day per well.

The invention is further illustrated by the following examples which are illustrative of various aspects of the invention and are not intended as limiting the scope of the invention as defined by the appended claims.

EXAMPLE 1

A California well T-33 having a depth of 1,124 feet which is newly completed produces for two months at a rate of 24 barrels per day (B/D) oil and 1 B/D water. It is desired to carry out an enhanced oil recovery treatment of this well with steam. However, it is believed the formation may contain fines which might damage the permeability of the formation if treated with steam. That is, experience with nearby wells indicates the formation may be water sensitive.

A one-inch diameter core having a length of 2.7 inches is removed from the well and tested in the laboratory to determine its sensitivity to water and its response to a treatment with steam containing ammonium ions. First a 3 percent by weight aqueous solution of sodium chloride is injected into the core at ambient temperature and 15 p.s.i. pressure for 3.5 hours at rates starting at 9.1 milliliters per minute (mls./min.) and dropping to 4 mls./min. as the permeability stabilizes. This established a base permeability of 92.8 millidarcys (mds.). Next, distilled water is flowed through the core at ambient temperature and 15 p.s.i. for 3.25 hours at rates starting at 6 mls./min. and dropping to 0.15 ml./min. where the permeability stabilizes at 3.5 percent of the base permeability to the sodium chloride solution. Next, there is added to boiler feedwater 64 grams/liter (gs./l) of ammonium carbonate. Steam is generated and injected into the core at 500° F. and 700 p.s.i. back pressure for 6 hours at a flow rate of 0.5 ml./min. Next, an aqueous solution containing 64 gs./l. of ammonium carbonate is injected into the core at ambient temperature and 15 p.s.i. for 6 hours at a flow rate of 13.2 mls./min. The permeability increased to 330 percent of the base permeability to the sodium chloride solution.

This Example shows that the injection of fresh water sharply reduces the permeability of the core. However, the permeability can be restored, and even substantially increased by treatment with steam containing ammonium carbonate. Thus, a well treated in this manner is stimulated. A treatment according to this invention commonly increases the permeability of a fines-containing formation at least 50 percent, often at least 150 percent, and in this instance, 330 percent of the base permeability.

EXAMPLE 2

There is injected into another one-inch diameter, 2.7 inch long core from the same well a 3 percent by weight aqueous solution of sodium chloride at ambient temperature and 15 p.s.i. for 3.75 hours at flow rates starting at 17.2 mls./min. and dropping to 12.2 mls./min. as the permeability stabilizes. This establishes a base permeability of 223 mds. Next, an aqueous solution containing 32 grams per liter ammonium carbonate is injected through the core at ambient temperature and 15 psi for 3 hours at a flow rate starting at 6.8 ml/min and stabilizing at 4.7 ml/min. The permeability drops to 40 percent of the base permeability to the sodium chloride solution. Next, there is added to boiler feedwater 32 g/l of ammonium carbonate. Steam is generated and injected into the core at 500° F. and 700 p.s.i. back pressure for 2 hours at a flow rate of 2 mls./min. For the next 2 hour period, the treatment is the same except the concentration of ammonium carbonate in the feedwater is reduced to 16 gs./l. For the next 2 hour period, the treatment is the same except the concentration of ammonium carbonate in the feedwater is reduced to 8 gs./l. At this point the permeability of the core is 173 percent of the base permeability to the sodium chloride solution. Next, there is flowed through the core a 3 percent by weight aqueous solution of sodium chloride at ambient temperature and 15 p.s.i. for 2 hours at a flow rate starting at 24 mls./min. and stabilizing at 22.5 mls./min. The permeability of the core is 184 percent of the base permeability to the originally injected sodium chloride solution. Finally, distilled water is injected through the core at ambient temperature and 15 p.s.i. for 2.75 hours at a flow rate starting at 28 mls./min. and stabilizing at 14 mls./min. The permeability of the core is 109 percent of the base permeability.

This Example shows that a core which is given a treatment with steam containing ammonium carbonate increases in permeability. The permeability remains high even when distilled water is run through the core.

EXAMPLE 3

Well T-33 is given a steam stimulation treatment as follows. A 42 percent by weight aqueous solution of urea is prepared and held in a blending tank. Eighty percent quality steam is generated by a battery of steam generators and flowed down a carbon steel flow line towards the well. At the surface of the well a 7-foot long section of stainless steel conduit is positioned in the carbon steel flow line. The aqueous solution of urea is injected into the steam flowing to the well at the upstream end of the stainless steel conduit segment to minimize corrosion. Steam generated from 600 barrels of feedwater per day is injected for 12.5 days The first day 674 gallons per day of the 42 percent by weight aqueous solution of urea is added to the steam. The second day 337 gallons per day of the same urea solution is added to the steam. For the remaining 10.5 days of the treatment, 168.5 gallons per day of the same urea solution is added to the steam. At the end of the treatment it is calculated that 2.3 billion B.T.U's. of heat is added to the formation. The well is shut in for 7 days and allowed to soak. The well is then returned to production. The production rate is as follows:
1st week—160 B/D oil and 75 B/D water.
2nd week—108 B/D oil and 61 B/D water.
3rd week—98 B/D oil and 11 B/D water.
4th week—90 B/D oil and 11 B/D water.

Thus, the treatment increases the rate of oil production substantially with no observable evidence of permeability reduction due to swelling or movement of formation fines.

While various specific embodiments and modifications of this invention have been described in the foregoing specification, further modifications are included within the scope of this invention as defined by the following claims.

We claim:
1. A method for conditioning a fines-containing, earthen formation including both surface and subsurface strata, to increase the flow of fluids through the formation which comprises injecting into the formation steam containing an effective fines-stabilizing amount of a compound containing ammoniacal nitrogen selected from the group consisting of ammonium hydroxide, and a water-soluble ammonia or ammonium ion precursor selected from the group consisting of amides of carbamic acid and thiocarbamic acid, derivatives of such amides, tertiary carboxylic acid amides and their substituted and alkylated derivatives characterized by the formula:

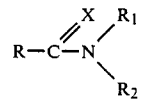

wherein (1) R is hydrogen or an organic radical, (2) $R_1$ and $R_2$ are independently selected from hydrogen and organic radicals, and (3) X is oxygen or sulfur.

2. A method for treating a fines-containing earthen formation, including both surface and subsurface strata, to stabilize the said formation against clay swelling and particle migration comprising injecting into the formation steam containing an effective fines-stabilizing amount of a compound containing ammoniacal nitrogen selected from the group consisting of ammonium hydroxide, and a water-soluble ammonia or ammonium ion precursor selected from the group consisting of amides of carbamic acid and thiocarbamic acid, derivatives of such amides, tertiary carboxylic acid amides and their substituted and alkylated derivatives characterized by the formula:

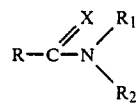

wherein (1) R is hydrogen or an organic radical, (2) $R_1$ and $R_2$ are independently selected from hydrogen and organic radicals, and (3) X is oxygen or sulfur.

3. In a method for enhanced oil recovery from a fines-containing subterranean formation penetrated by a well wherein steam is injected into the formation, the improvement which comprises injecting along with the steam an effective fines-stabilizing amount of a compound containing ammoniacal nitrogen selected from the group consisting of ammonium hydroxide, and a water-soluble ammonia or ammonium ion precursor selected from the group consisting of amides of carbamic acid and thiocarbamic acid, derivatives of such amides, tertiary carboxylic acid amides and their substituted and alkylated derivatives characterized by the formula:

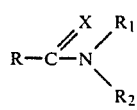

wherein (1) R is hydrogen or an organic radical, (2) $R_1$ and $R_2$ are independently selected from hydrogen and organic radicals, and (3) X is oxygen or sulfur.

4. A method for stimulating a fines-containing subterranean formation penetrated by a well comprising injecting into the formation steam containing an effective fines-stabilizing amount of a compound containing ammoniacal nitrogen selected from the group consisting of ammonium hydroxide, and a water-soluble ammonia or ammonium ion precursor selected from the group consisting of amides of carbamic acid and thiocarbamic acid, derivatives of such amides, tertiary carboxylic acid amides and their substituted and alkylated derivatives characterized by the formula:

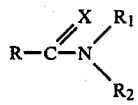

wherein (1) R is hydrogen or an organic radical, (2) $R_1$ and $R_2$ are independently selected from hydrogen and organic radicals, and (3) X is oxygen or sulfur.

5. The method defined in claims 1, 2, 3 or 4 wherein the amount of the compound containing ammoniacal nitrogen is more than 0.1 to 25 percent by weight based on the weight of boiler feedwater used to generate the steam.

6. The method defined in claims 1, 2, 3 or 4 wherein the amount of the compound containing ammoniacal nitrogen is about 0.5 to 5 percent by weight based on the weight of boiler feedwater used to generate the steam.

7. The method defined in claims 1, 2, 3 or 4 wherein the compound containing ammoniacal nitrogen is added to the boiler feedwater used to generate the steam.

8. The method defined in claims 1, 2, 3 or 4 wherein the compound containing ammoniacal nitrogen is added to the steam.

9. The method defined in claims 1, 2, 3 or 4 wherein the earthen formation is a subsurface stratum penetrated by a well and the compound containing ammoniacal nitrogen is added to the steam at the surface of the well.

10. The method defined in claims 1, 2, 3 or 4 wherein the earthen formation is a subsurface stratum penetrated by a well and the compound containing ammoniacal nitrogen is added to the steam downhole before the steam enters the subsurface stratum.

11. The method defined in claims 1, 2, 3 or 4 wherein the fines include water-swellable clays.

12. The method defined in claims 1, 2, 3 or 4 wherein the compound containing ammoniacal nitrogen is an amide of carbamic acid selected from the group consisting of urea, biuret, triuret and ammonium carbamate.

13. The method defined in claims 1, 2, 3 or 4 wherein the compound containing ammoniacal nitrogen is urea.

14. The method defined in claims 1, 2, 3 or 4 wherein the compound containing ammoniacal nitrogen is thiourea.

15. The method defined in claims 1, 2, 3 or 4 wherein the compound containing ammoniacal nitrogen is a derivative of carbamic acid selected from the group consisting of monomethylolurea and dimethylolurea.

16. The method defined in claims 1, 2, 3 or 4 wherein the compound containing ammoniacal nitrogen is a tertiary carboxylic acid amide, substituted tertiary carboxylic acid amide or derivative of a tertiary carboxylic acid selected from the group consisting of formamide, acetamide, N,N-dimethylformamide, N,N-diethylformamide, N,N-dimethylacetamide, N,N-diethylacetamide, N,N-dipropylacetamide, N,N-dimethylpropionamide and N,N-diethylpropionamide.

17. The method defined in claims 1, 2, 3 or 4 wherein the organic radical which comprises R is an alkyl group containing 1 to about 8 carbon atoms or an α-hydroxy substituted alkyl group containing 1 to about 8 carbon atoms.

18. The method defined in claims 1, 2, 3 or 4 wherein the organic radicals which comprise $R_1$ and $R_2$ are the same or different alkyl groups containing 1 to about 8 carbon atoms.

19. The method defined in claims 1, 2, 3 or 4 wherein the method for conditioning increases the permeability of the earthen formation at least 50 percent based on the permeability prior to the carrying out of the method for conditioning.

20. The method defined in claims 1, 2, 3 or 4 wherein the method for conditioning increased the permeability of the earthen formation at least 150 percent based on the permeability prior to the carrying out of the method for conditioning.

21. A method for treating an earthen formation including both surface and subsurface strata, to stimulate the flow of fluids through the formation comprising injecting into the formation steam containing an ammonium ion or ammonia precursor selected from the group consisting of amides of carbamic acid and thiocarbamic acid, derivatives of such amides, and tertiary carboxylic acid amides and their substituted and alkylated derivaties characterized by the formula:

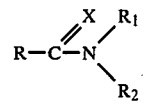

wherein (1) R is hydrogen or an organic radical, (2) $R_1$ and $R_2$ are independently selected from hydrogen and organic radicals, and (3) X is oxygen or sulfur.

22. In a method for enhanced oil recovery from a subterranean formation penetrated by a well wherein steam is injected into the formation, the improvement which comprises injecting along the steam an ammonium ion or ammonia precursor selected from the group consisting of amides of carbamic acid and thiocarbamic acid, derivatives of such amides, and tertiary carboxylic acid amides and their substituted and alkylated derivatives characteized by the formula:

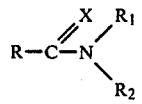

wherein (1) R is hydrogen or an organic radical, (2) $R_1$ and $R_2$ are independently selected from hydrogen and organic radicals, and (3) X is oxygen or sulfur.

23. The method defined in claims 21 or 22 wherein the amount of precursor employed is more than 0.1 to 25 percent by weight based on the weight of boiler feedwater used to generate the steam.

24. The method defined in claim 23 wherein the precursor is employed urea.

25. The method defined in claim 21 or 22 wherein the precursor is employed urea.

* * * * *

UNITED STATES PATENT OFFICE
CERTIFICATE OF CORRECTION

Patent No. 4,549,609    Dated  October 29, 1985

Inventor(s) David R. Watkins, Robert K. Knight, Donald C. Young and Leonard J. Kalfayan It is certified that error appears in the above-identified patent and that said Letters Patent are hereby corrected as shown below:

Column 10, line 63 (claim 24) delete "employed";

Column 10, line 65 (claim 25) delete "employed".

Signed and Sealed this

Thirteenth Day of May 1986

[SEAL]

Attest:

Attesting Officer

DONALD J. QUIGG

Commissioner of Patents and Trademarks